US008855116B2

(12) United States Patent
Rosset et al.

(10) Patent No.: US 8,855,116 B2
(45) Date of Patent: Oct. 7, 2014

(54) VIRTUAL LOCAL AREA NETWORK STATE PROCESSING IN A LAYER 2 ETHERNET SWITCH

(75) Inventors: Sebastien Rosset, Sunnyvale, CA (US); Keerthana Parthasarathy, Karnataka, IN (US)

(73) Assignee: Cisco Technology, Inc., San Jose, CA (US)

( * ) Notice: Subject to any disclaimer, the term of this patent is extended or adjusted under 35 U.S.C. 154(b) by 224 days.

(21) Appl. No.: 13/472,006

(22) Filed: May 15, 2012

(65) Prior Publication Data

US 2013/0308647 A1    Nov. 21, 2013

(51) Int. Cl.
*H04L 12/28*    (2006.01)
*H04L 12/56*    (2006.01)
*H04L 12/50*    (2006.01)
*H04L 12/46*    (2006.01)

(52) U.S. Cl.
CPC .................................. *H04L 12/4641* (2013.01)
USPC ............ 370/392; 370/389; 370/351; 370/352

(58) Field of Classification Search
CPC ............ H04L 12/4641; H04L 12/4687; H04L 12/465; H04L 12/4675; H04L 12/4679; H04L 12/4683; H04L 12/4691; H04L 12/4695; H04L 12/4654; H04L 12/4658; H04L 12/4662; H04L 12/467
USPC .......... 370/392, 389, 256, 351, 352, 353, 355
See application file for complete search history.

(56) References Cited

U.S. PATENT DOCUMENTS

| | | | |
|---|---|---|---|
| 7,706,345 B2 | 4/2010 | Meier et al. | |
| 8,000,266 B2 | 8/2011 | Bulusu et al. | |
| 2008/0144533 A1* | 6/2008 | Bulusu et al. ................. | 370/256 |
| 2012/0072909 A1* | 3/2012 | Malik et al. ....................... | 718/1 |

OTHER PUBLICATIONS

Burns, Robert, "UCS 2.1(1a) released on CCO!", Nov. 20, 2012, Cisco Support Forums, Cisco, all pages.*
"Introducing VLAN", http://blogs.cisco.com/datacenter/introducing-vxlan/, 9 pages. Published Aug. 30, 2011.
"STP per VLAN Group", http://www.brocade.com/support/Product_Manuals/ServerIron_SwitchRouterGuide/STP.6.4. html, 5 pages. Published Jun. 10, 2009.

* cited by examiner

*Primary Examiner* — Kwang B Yao
*Assistant Examiner* — Adam Duda
(74) *Attorney, Agent, or Firm* — Edell, Shapiro & Finnan, LLC (57) ABSTRACT

A method, apparatus and computer-readable storage media are provided for determining, at a physical switch configured to interface with a plurality of physical servers via a plurality of corresponding physical ports of the physical switch, a number of virtual local area networks (VLANs) serviced by the plurality of physical servers, each of which is configured to service one or more virtual machines in one or more of the VLANs. A plurality of VLAN compression groups are automatically defined such that a port VLAN count of the physical switch is reduced, wherein the port VLAN count identifies a number of VLANs that interface with the physical switch via the plurality of physical ports. The one or more VLANs are automatically assigned to one of the VLAN compression groups.

17 Claims, 6 Drawing Sheets

VIRTUAL LOCAL AREA NETWORK STATE PROCESSING IN A LAYER 2 ETHERNET SWITCH

TECHNICAL FIELD

The present disclosure relates to handling virtual local area networks.

BACKGROUND

Physical local area networks (LANs) are networks of physical network devices (e.g., computers, servers, switches, etc.) located within a same area. The physical network devices within a particular physical LAN are connected to each other by a physical switch device via a plurality of physical ports on the physical switch. Thus, the physical network devices can send data communications (e.g., packets) to each other via the physical switch. The physical switch enables packet routing between the physical network devices and also prevents packet collisions from occurring. Multiple LANs are connected to each other via multiple physical switches.

A network manager may logically segment the physical LANs into virtual LANs (VLANs) by using software hosted by one or more of the physical network devices in the physical LANs. For example, the physical network devices (e.g., physical servers) may host multiple "virtual" network devices and "virtual" switches. Thus, the virtual network devices can send and receive data communications with one another within VLANs associated with the virtual network devices and the virtual switches. For example, packets may be sent between physical servers that host the virtual network devices via the physical ports of the physical switch connected to the physical servers. When a large number of VLANs are deployed, however, the physical ports of the physical switch may be overloaded and data communications between virtual network devices in the VLANs may be interrupted.

DESCRIPTION OF EXAMPLE EMBODIMENTS

Overview

A method, apparatus and computer-readable storage media are provided for determining, at a physical switch configured to interface with a plurality of physical servers via a plurality of corresponding physical ports of the physical switch, a number of virtual local area networks (VLANs) serviced by the plurality of physical servers, each of which is configured to service one or more virtual machines in one or more of the VLANs. A plurality of VLAN compression groups are automatically defined such that a port VLAN count of the physical switch is reduced, wherein the port VLAN count identifies a number of VLANs that interface with the physical switch via the plurality of physical ports. The one or more VLANs are automatically assigned to one of the VLAN compression groups.

Example Embodiments

Figure 1:
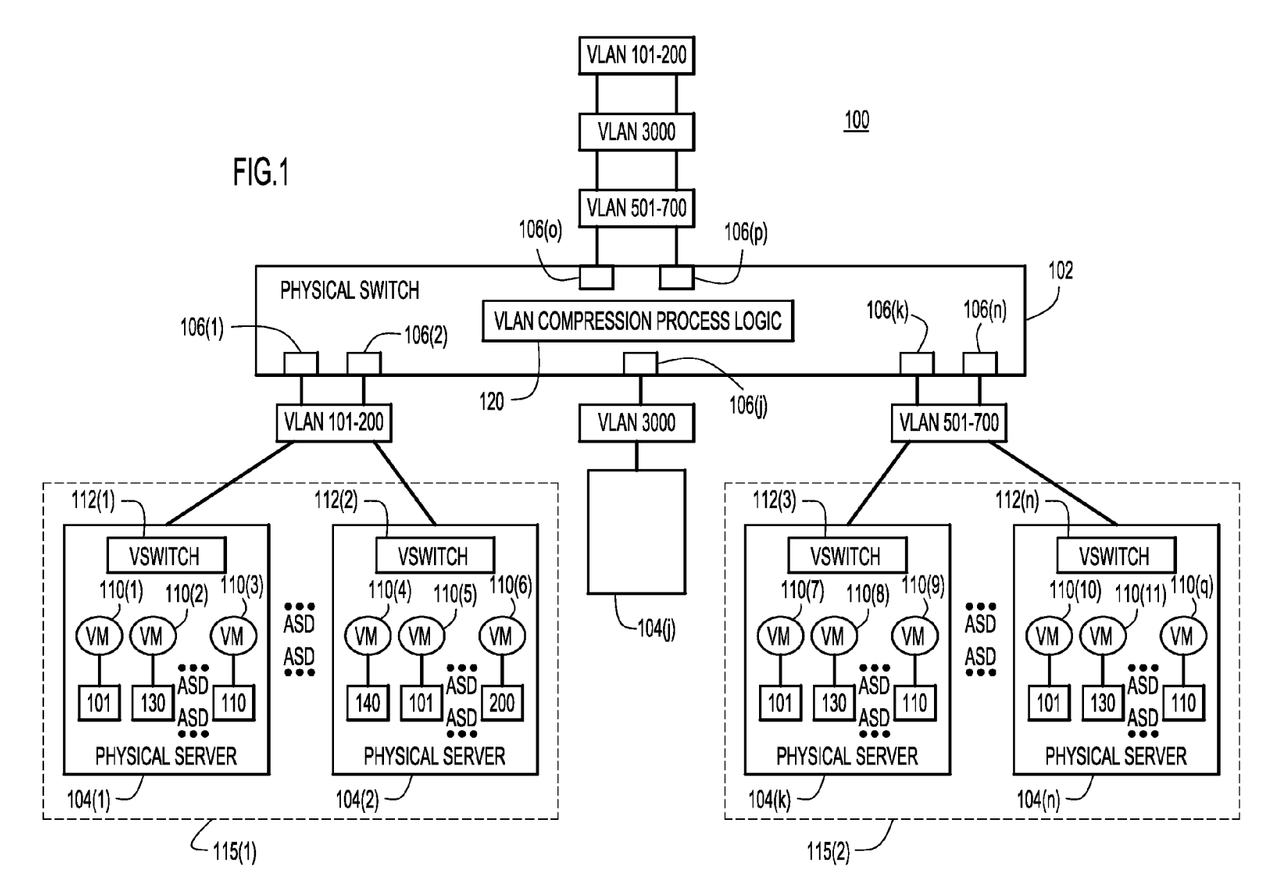
FIG. 1 shows an example topology depicting a physical switch that is in communication a plurality of physical servers and that is configured with VLAN compression process logic to define VLAN compression groups.

The techniques described hereinafter are directed to assigning virtual local area networks (VLANs) to one or more VLAN compression groups automatically. An example topology 100 is illustrated in FIG. 1. The topology 100 comprises a physical switch 102 in communication with a plurality of physical servers, shown at reference numerals 104(1)-104(n). The physical switch 102 interfaces with the plurality of physical servers 104(1)-104(n) via corresponding physical ports on the physical switch. These physical ports are shown at reference numerals 106(1)-106(n). Data communications can be sent between the physical switch 102 and the physical servers 104(1)-104(n) via corresponding ones of the physical ports 106(1)-106(n) associated with the physical servers. For example, as shown in FIG. 1, data communications can be sent between physical server 104(1) to the physical switch 102 via physical port 106(1), data communications can be sent between physical server 104(2) to physical switch 102 via physical port 106(2), and so on. FIG. 1 also shows physical ports 106(o) and 106(p) that are configured to enable data communications between the physical switch 102 and upstream network devices (not shown in FIG. 1) in communication with the physical switch 102 via the physical ports 106(o) and 106(p).

Each of the physical servers 104(1)-104(n) may be configured to host one or more "virtual" machines ("VMs"). These virtual machines are shown at reference numerals 110(1)-110(q). Additionally, each of the physical servers 104(1)-104(n) may be configured to host one or more "virtual" switch devices (hereinafter "virtual switches" or "vswitch"). These virtual switches are shown at reference numerals 112(1)-112(n). A virtual switch 112 hosted by a physical server is configured to service one or more of the virtual machines that are also hosted by that physical server, for example, to enable data communications, via, e.g., virtual Ethernet connections between virtual machines in topology 100. The physical servers 104(1)-104(2) may host respective virtual machines and virtual switches on hardware or software components. The virtual machines, for example, run on the physical servers and virtual interfaces between the virtual machine and physical servers have a relationship with the physical switch 102.

The virtual machines 110(1)-110(q) may be arranged in one or more virtual local area networks (VLANs). Virtual machines may communicate with other virtual machines in the same VLAN. Virtual machines that belong to the same VLAN may be hosted by different physical servers and serviced by different virtual switches. For example, as shown in FIG. 1, a first virtual machine 110(1) may be hosted by a first physical server 104(1) and may be arranged in a first VLAN (e.g., VLAN 101). Another virtual machine (e.g., virtual machine 110(5)) may be hosted by a second physical server 104(2) and may also be arranged in the VLAN 101. Thus, the virtual machine 110(1) may be able to send and receive data communications (e.g., packets) to and from the virtual machine 110(5) across VLAN 101, even though the virtual machine 110(1) is hosted on physical server 104(1) and virtual machine 110(5) is hosted on physical server 104(2).

In this example, for data communications from the virtual machine 110(1) to the virtual machine 110(5), packets are sent from the virtual machine 110(1) to the virtual switch 112(1) that services the virtual machine 110(1) (e.g., over a virtual Ethernet link). The virtual switch 112(1) then sends the packet to the physical switch 102 via a corresponding physical port (e.g., physical port 106(1)) over, e.g., a physical Ethernet link between the physical server 104(1) and the physical switch 102. Upon receiving the packet, the physical switch 102 analyzes the packet for appropriate destination identifier information (e.g., media access control (MAC) address information) contained within the packet and sends the packet (e.g., over a physical Ethernet link) to the appropriate physical server that hosts the destination virtual machine (e.g., physical server 104(2) hosting virtual machine 110(5)) via an appropriate physical port (e.g., physical port 106(2)) associated with that physical server 104(2). Upon receiving the packet, the virtual switch 112(2), residing in the physical server 104(2), sends the packet to the virtual machine 110(5) (e.g., over a virtual Ethernet link).

The physical ports of the physical switch 102 may be any type of port configured to enable data communications between physical servers and other network devices. For example, the physical ports of the physical switch 102 may be Ethernet ports configured to send and receive Ethernet packets. It should also be appreciated that any number of physical ports, physical servers, virtual machines and virtual switches may reside in topology 100. Additionally, the virtual machines and virtual switches may be arranged in any number of VLANs.

The physical servers in topology 100 may be arranged in physical server clusters, shown at reference numerals 115(1) and 115(2). The physical server clusters represent groups of physical clusters that may be located physically together. For example, the physical server clusters may be enterprise locations of one or more physical servers arranged together to enable data communications in topology 100. As shown in FIG. 1, physical server cluster 115(1) comprises physical server 104(1) and physical server 104(2) while physical server cluster 115(2) comprises physical server 104(k) and physical server 104(n). It should be appreciated that topology 100 may comprise any number of physical server clusters comprising any number of physical servers.

As stated above, virtual machines that are arranged in a same VLAN in topology 100 may send and receive data communications with each other via physical ports on the physical switch 102. As such, the physical ports on the physical switch 102 must be configured to enable data communications within these VLANs. For example, for data communications between virtual machine 110(1) and virtual machine 110(5), the corresponding physical ports 106(1) and 106(2) on the physical switch 102 must be configured to enable data communications in VLAN 101. Additionally, these physical ports must also be configured to enable data communications in other VLANs of other virtual machines located in these VLANs and hosted by the physical servers 104(1) and 104(2) that are serviced by these physical ports. In other words, the physical ports of the physical switch 102 must be configured to enable data communications in every VLAN of the virtual machines that is hosted by corresponding physical servers at each of the physical ports.

Often times, one or more of the physical servers 104(1)-104(n) are disconnected from topology 100. For example, one of the physical servers 104(1)-104(n) or the physical server clusters 115(1) and 115(2) may be removed from topology 100 for hardware/software maintenance. When this happens, the virtual machines that are hosted by the soon-to-be disconnected physical servers are reassigned to physical servers that are still connected to topology 100. For example, in FIG. 1, the physical server 104(1) may be disconnected from topology 100, and accordingly the virtual machines 110(1)-110(6) may be reassigned to physical server 104(2) before the physical server 104(1) is disconnected. Thus, in this example, after the virtual machines are reassigned to physical server 104(2), if virtual machine 110(2) needs to send data communications in VLAN 130, the physical port (e.g., physical port 106(2)) servicing the physical server 104(2) hosting these virtual machines needs to be configured to enable communications in VLAN 130. Likewise, this physical port also needs to be configured to enable communications in VLANs of the other virtual machines hosted by the physical server 104(1) (e.g., VLAN 101 and 110) and also in VLANs of the virtual machines hosted by physical server 104(2) (e.g., VLAN 101, 140 and 200). In other words, physical port 106(2) needs to be configured to enable communications in the VLANs of the virtual machines hosted by both physical server 104(1) and physical server 104(2).

Thus, to allow for virtual machines to be reassigned to other physical servers, all of the physical ports in the physical switch 102 may need to be configured to enable communications between virtual machines in all VLANs in topology 100. The physical switch 102, however, may be limited as to the number of VLANs that its physical ports can service, and this limit may be lower than the total number of VLANs in topology 100 across the physical ports. In other words, the physical switch 102 may be governed by a port/VLAN ("P/V count") limit that is set, for example, by a network administrator accordingly to network policies or processing capacities of the physical switch 102. In accordance with embodiments described in detail hereinafter, the physical switch 102 is configured with VLAN compression process logic 120 that automatically defines a plurality of VLAN compression groups and automatically assigns one or more VLANs to the VLAN compression groups to effectively lower the P/V count of the physical switch 102 without any manual provisioning of the physical switch 102.

Figure 2:
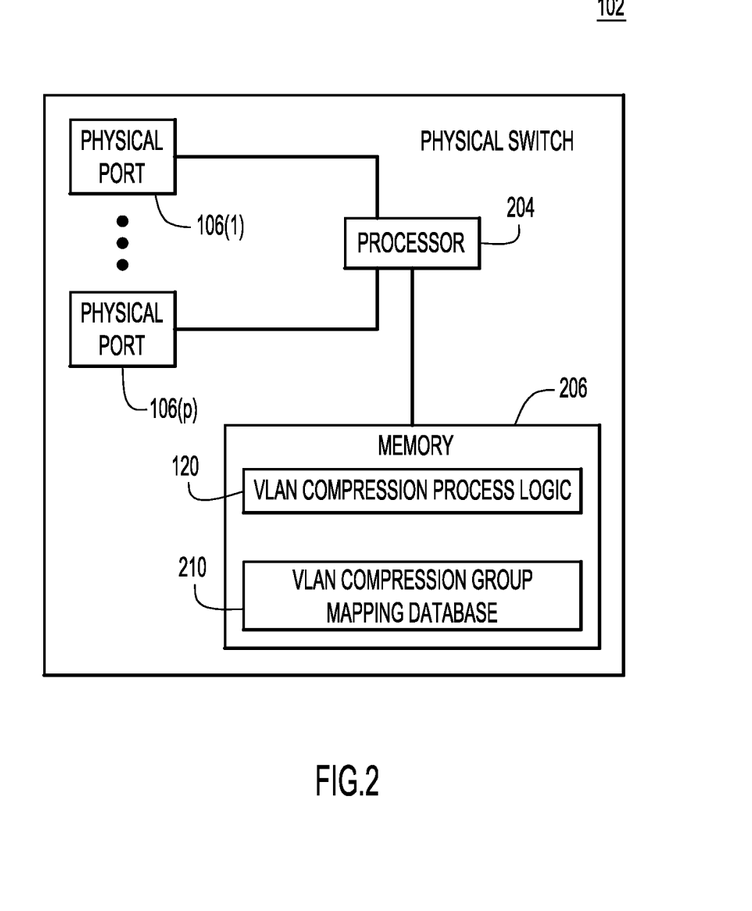
FIG. 2 shows an example block diagram of the physical switch configured with VLAN compression process logic to define, automatically, a plurality of VLAN compression groups and automatically assign one or more VLANs to the one or more VLAN compression groups.

Reference is now made to FIG. 2. FIG. 2 shows the physical switch 102 configured with a plurality of physical ports 106(1)-106(p), a processor 204 and a memory 206. As stated above, the physical ports 106(1)-106(p) enable the physical switch to send and receive data communications (e.g., packets) to and from corresponding physical servers 104(1)-104(n) and other network devices. In one example, the physical ports 106(1)-106(p) may be Ethernet ports. The physical ports 106(1)-106(p) are coupled to the processor 204. The processor 204 is a microprocessor or microcontroller that is configured to execute program logic instructions (i.e., software) for carrying out various operations and tasks described herein. For example, the processor 204 is configured to execute the VLAN compression process logic 120 that is stored in the memory 206 to define a plurality of VLAN compression groups and to assign one or more VLANs hosted by the physical severs 104(1)-104(n) to the VLAN compression groups. The functions of the processor 204 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 206 may comprise read only memory (ROM), random access memory (RAM), magnetic disk storage media devices, optical storage media devices, flash memory devices, electrical, optical, or other physical/tangible memory storage devices. The memory 206 stores software instructions for the VLAN compression process logic 120. The memory 206 may also store a VLAN compression group mapping database 210, which contains mapping information for one or more VLANs to one or more VLAN compression groups Thus, in general, the memory 206 may comprise one or more computer readable storage media (e.g., a memory storage device) encoded with software comprising computer executable instructions and when the software is executed (e.g., by the processor 204) it is operable to perform the operations described for the VLAN compression process logic 120.

The VLAN compression process logic 120 may take any of a variety of forms, so as to be encoded in one or more tangible computer readable memory media or storage device for execution, such as fixed logic or programmable logic (e.g., software/computer instructions executed by a processor), and the processor 204 may be an application specific integrated circuit (ASIC) that comprises fixed digital logic, or a combination thereof.

For example, the processor 204 may be embodied by digital logic gates in a fixed or programmable digital logic integrated circuit, which digital logic gates are configured to perform the VLAN compression process logic 120. In general, the VLAN compression process logic 120 may be embodied in one or more computer readable storage media encoded with software comprising computer executable instructions and when the software is executed operable to perform the operations described hereinafter.

In general, as stated above, the physical switch 102 has a P/V count limit that limits the total number of VLANs that the physical ports 106(1)-106(p) of the physical switch 102 are configured to service. When the physical switch 102 is servicing many physical servers, each of which is hosting many virtual machines in many VLANs, the P/V count of the physical switch 102 may quickly exceed the P/V count limit. For example, as described above, the physical ports 106(1)-106(n) may need to be configured such that each of the physical ports 106(1)-106(n) is able to service all of the VLANs present in topology 100. This is particularly important when one or more virtual machines are reassigned to different physical servers due to a disconnection (planned or otherwise) of the original physical server(s) that host these virtual machines from the physical switch 102. As described above, the physical ports of the physical switch 102 that correspond to these different physical servers need to be configured to service VLANs associated with the reassigned virtual machines in order to ensure and maintain data communications between the virtual machines.

For example, if the virtual machines 110(1)-110(q) are arranged in 3000 VLANs (as shown, for example, in FIG. 1), each of the physical ports 106(1)-106(n) needs to be configured to service all 3000 VLANs in order to account for potential reassignment of virtual machines to new physical servers. Accordingly, if there are "n" physical ports, the P/V count for the physical switch 102 is "P/V count"=n*3000, since each of the "n" physical ports has to be configured to service all 3000 VLANs. Assuming a P/V count limit of the physical switch 102 of, for example, 4096, the assignment of each of the 3000 VLANs to each of the physical ports 106(1)-106(n) would far exceed this P/V count limit when n>1. Since the P/V count limit of the physical switch 102 would be exceeded, the physical switch 102 would not be able to service communications in every VLAN, and communications between virtual machines may be interrupted or dropped. It should be appreciated that these numbers are used only as examples.

In order for the physical switch 102 to service all of the VLANs in topology 100 without reaching the P/V count limit, the VLAN compression process logic 120 evaluates the VLANs in topology 100 and automatically assigns them into defined VLAN compression groups to reduce the P/V count of the physical switch 102, as described hereinafter. For example, the VLAN compression groups effectively reduce the P/V count of the physical switch 102 by aggregating one or more VLANs into a plurality of groups, each of which is counted once for purposes of the P/V count. For example, if the 3000 VLANs in FIG. 1 are grouped into 6 VLAN compression groups, for "n" physical ports, the P/V count is reduced from "P/V count"=n*3000 to "P/V count"=n*6, thus effectively lowering the P/V count below the P/V count limit for the physical switch 102.

Figure 3:
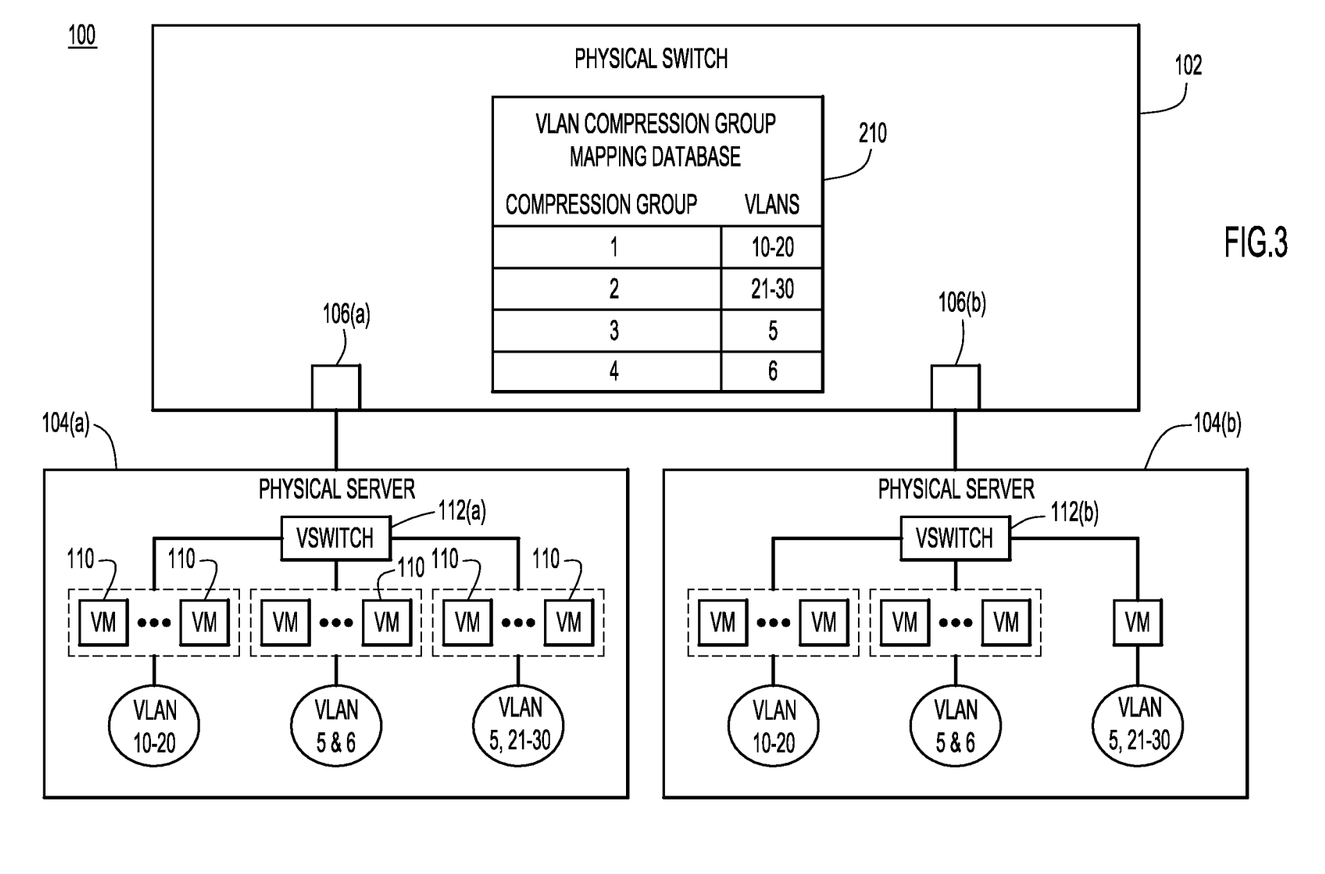
FIG. 3 shows an example of the physical switch automatically assigning the one or more VLANs to the one or more VLAN compression groups.

Reference is now made to FIG. 3, which shows an example assignment of VLANs into defined VLAN compression groups. FIG. 3 shows two physical servers at reference numerals 104(a) and 104(b). As shown, these physical servers are configured to host a plurality of virtual machines 110 in a plurality of VLANs, according to the techniques described above in connection with FIG. 1. The physical servers 104(a) and 104(b) are configured to interface with the physical switch 102, as described above in connection with FIG. 1, across physical ports 106(a) and 106(b).

In FIG. 3, the physical server 104(a) hosts VMs 110 that belong to VLANs 5, 6, and 10-30. The physical server 104(b) hosts VMs 110 that belong to VLANs 6 and 10-30. The physical switch 102, using the VLAN compression process logic 120, automatically compresses these VLANs into four groups, as shown in the VLAN compression group mapping database 210. For example, the first VLAN compression group comprises VLANs 10-20, the second VLAN compression group comprises VLAN 21-30, the third VLAN compression group comprises VLAN 5 and the fourth VLAN compression group comprises VLAN 6. Thus, the VLAN compression process logic 120 reduces the P/V count of the physical switch 102 from 44 (e.g., 22 VLANs multiplied by two physical ports) to eight (e.g., eight VLAN compression groups multiplied by two physical ports). For larger numbers of VLANs and physical ports, the VLAN compression may reduce the P/V count of the physical switch 102 from a value above the P/V count limit to a value below the P/V count limit.

In one example, the VLAN compression process logic 120 automatically defines the VLAN compression group according to the following process. First, the VLAN compression process logic 120 causes the physical switch 102 to evaluate topology 100 to determine a first set all of the VLANs that are hosted by the physical servers that interface with the physical switch 102. After determining the total number of VLANs, the VLAN compression process logic 120 causes the physical switch 102 to create a VLAN exclusion list. The VLAN exclusion list comprises a list of VLANs that are to be removed from the first set of all of the VLANs. For example, the following VLANs may be included in the VLAN exclusion list: Fiber Channel over Ethernet (FCoE) VLANs, Primary private VLANs (PVLANs), Secondary PVLANs, VLANs specified as a switched port analyzer network (SPAN) and VLANs configured as a single allowed VLAN on an interface (e.g., a virtual network interface card (vNIC) of the virtual switch configured with a single allowed VLAN).

After removing the VLANs in the exclusion list from the first set, a second set of VLANs is generated for all of the Ethernet interfaces that are configured to interface with one or more VLANs other than the VLANs in the exclusion list. For example, the Ethernet interfaces may comprise links from the physical ports to the physical servers and may also include uplink physical ports (e.g., physical ports 106(*o*) and 106(*p*) in FIG. 1) of the physical switch 102. For each of the Ethernet interfaces in the second set, a set of allowed VLANs is generated. A set operation is performed on the sets of allowed VLANs for each Ethernet interface in order to find the optimal number of VLAN compression groups. For example, the optimal number of VLAN compression groups may be equivalent to the minimum cardinality set of mutually disjoint subsets of the sets of allowed VLANs. In other words, the set intersections are determined for all of the sets of allowed VLANs, and any subsets with a cardinality less than or equal to one is discarded. Upon determining the optimal number of VLAN compression groups, all of the VLANs in a particular VLAN compression group are evaluated to determine whether they share a same management protocol (e.g., internet grouping management protocol (IGMP)). This evaluation is repeated for each of the VLAN compression groups. If all VLANs in a given VLAN compression group do not share the same management protocol, then the VLAN compression group is further split into additional VLAN compression groups to ensure that all VLAN members have the same management protocol.

Figure 4:
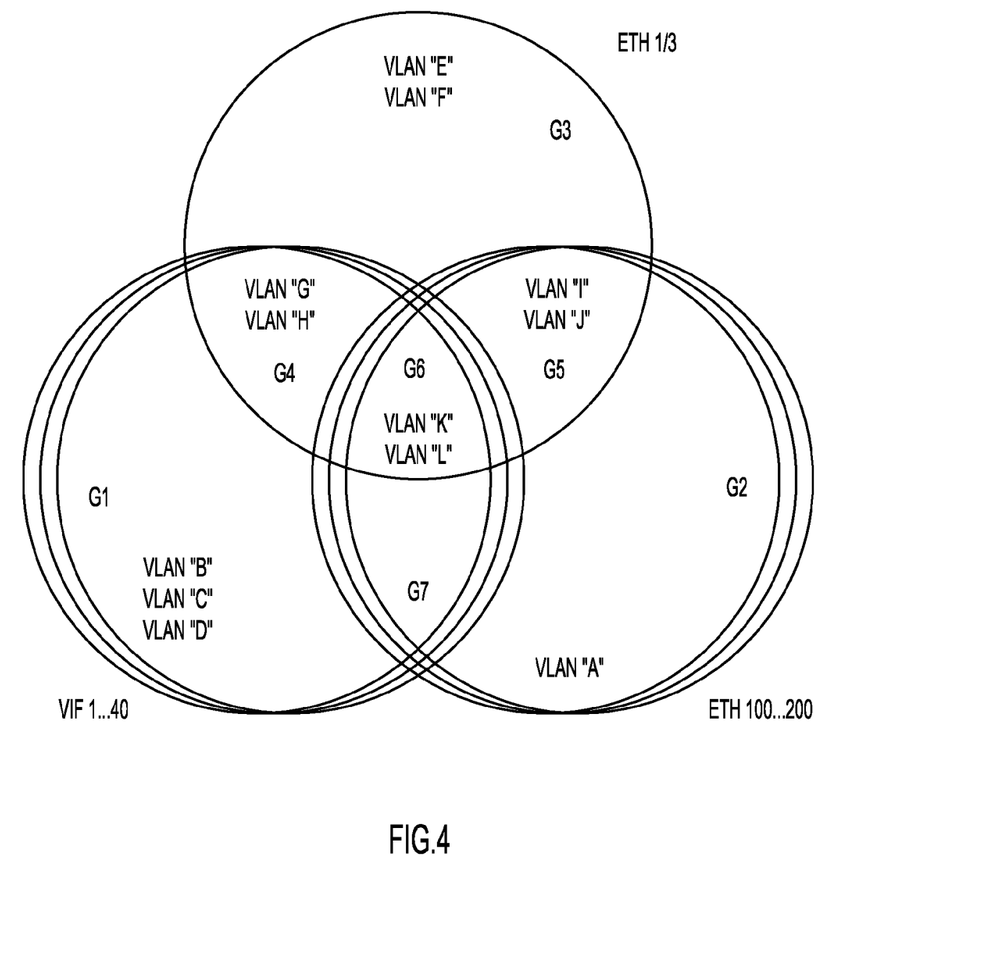
FIG. 4 shows an example diagrammatic representation of the VLAN compression groups that are automatically defined by the VLAN compression process logic.

Reference is now made to FIG. 4. FIG. 4 shows an example diagrammatic representation of the VLAN compression groups that are automatically defined by the VLAN compression process logic 120. In FIG. 4, a Venn diagram is used to show the mutually disjoint subsets of all of the sets of allowed VLANs. In other words, in FIG. 4, subsets G1-G7 are mutually disjoint (e.g., given any two subsets in FIG. 4, the intersection of those two subsets is an empty set). In FIG. 4, VLAN compression group G1 has three VLANs (shown as VLANs "B," "C," and "D"), compression group G2 has a single VLAN (shown as VLAN "A"), compression group G3 has two VLANs (shows as VLANs "E" and "F"), compression group G4 has two VLANs (shows as VLANs "G" and "H"), compression group G5 has two VLANs (shown as VLANs "I" and "J") and compression group G6 has two VLANs (shows as VLANs "K" and "L"). VLAN compression group G7 has zero VLANs, and since this group has a cardinality less than one, VLAN compression group G7 is discarded. Thus, the VLAN compression process logic 120, discussed above, automatically defines VLAN compression groups (G1 to G6) and automatically assigns appropriate VLANs to these compression groups.

It should be appreciated that the VLAN compression process logic 120 automatically defines these compression groups and assigns VLANs to these compression groups without requiring a manual provisioning of the physical switch 102. As a result, the compression techniques performed by the VLAN compression process logic 120 allow the physical switch 102 to support a significantly higher P/V count limit by automatically binding or grouping multiple VLANs into VLAN compression groups without any user configuration. A network user or administrator is not required to manually provision these VLAN compression groups. In one example, in order to enable or disable the VLAN compression feature, a sub-system of the physical switch 102 provides a single global parameter to initiate or "switch on" the VLAN compression. The automatic definition of the VLAN compression groups and assignment of VLANs to these compression groups enables a network user to continue configuring the physical switch 102 without any change to the VLAN and interface configuration. VLAN groups are computed and configured such that there is no impact on data paths or communications between virtual machine and upstream network devices. That is, from a data path perspective, it does not matter if VLAN compression is enabled or not, as data communications remain uninterrupted. Additionally, the VLAN compression techniques minimize an apparent processing load of the physical switch 102 and maximize the computer processor unit (CPU) utilization for the physical switch 102. For example, when the VLAN compression techniques are enables, more CPU cycles are available for the switch to perform its regular or normal operational tasks.

Typically, the VLAN compression process logic 120 of the physical switch 102 automatically computes the VLAN compression groups such that hardware constraints (e.g., constrains imposed by application specific integrated circuits (ASICs)) are satisfied. For example, the physical switch 102 may be governed by the following constraints when generating the VLAN compression groups: the configured VLANs on an Ethernet interface can include zero or more VLAN groups and VLANs that are not members of any VLAN compression groups; a VLAN cannot be a part of multiple VLAN compression groups; a VLAN may be part of zero VLAN compression groups; to reduce CPU usage and since there may be no gain in creating empty VLAN compression groups or groups that contain a single VLAN, a VLAN compression group should contain at least two VLANs; PVLANs may not be part of a VLAN compression group; FCoE VLANs may not be part of a VLAN compression group; if an interface carries a single VLAN, then the VLAN may not be a member of a VLAN compression group; all VLANs in a compression group should have the same IGMP snooping policy; and if a VLAN is part of a SPAN source, it may not be part of a VLAN compression group.

Figure 5:
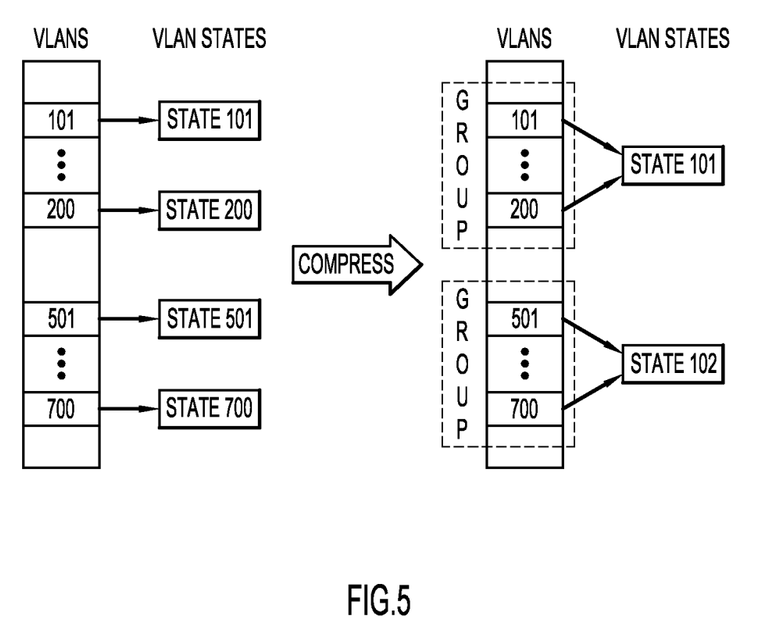
FIG. 5 shows an example diagrammatic representation of the VLAN compression groups and assignment of VLAN states to the compression groups.

Reference is now made to FIG. 5, which shows a diagrammatic representation of the VLAN compression groups and assignment of VLAN states to the compression groups. As shown in FIG. 5, before the VLAN compression techniques, each VLAN may be assigned to a particular VLAN state value. Thus, before the VLAN compression techniques are initiated by the physical switch 102, the number of VLAN states equals the total number of VLANs in topology 100. After the VLAN compression techniques are initiated, VLAN states are assigned to VLAN compression groups. Thus, the VLAN compression techniques reduce both the P/V count for the physical switch 102 as well as the VLAN states assigned to the VLAN compression groups.

The VLAN states may be used to route packets to appropriate network devices. For example, for packet communications from one or more of the virtual machines to an upstream network device, the physical switch 102 may evaluate the VLAN state associated with the received packet to ensure that the packet is directed to the appropriate network device in the appropriate VLAN. For example, if a data packet is to be flooded to one or more physical ports of the physical switch 102, the physical switch 102 can use the VLAN state information to forward the packet to the appropriate physical ports. For example, data packets received from a source virtual machine belonging to a first VLAN in a first one of the VLAN compression groups can be routed or sent (e.g., layer 2 operations) to a second VLAN in the first one of the VLAN compression groups based on the VLAN state value associated with the first one of the VLAN compression groups.

The VLAN state information may reside in a VLAN state table in memory 206 of the physical switch 102. Before the VLAN compression techniques, there is a one-to-one relationship between a VLAN and a VLAN state. With VLAN state compression, VLANs within the same VLAN group share the same VLAN state. Thus, when a VLAN state changes (e.g., when a new VLAN state is assigned to a VLAN compression group), the CPU processing of the physical switch 102 may be reduced since only a single VLAN hardware state update is needed for an entire VLAN compression group (as opposed to VLAN hardware state updates for each individual VLAN). Thus, the reduction/compression of VLAN states allow for a reduction in the apparent processing load of the physical switch 102. Additionally, the VLAN state information may be stored in a main memory (e.g., random access memory (RAM)) of the physical switch 102 as well as the internal memory of the ASIC of the physical switch 102.

Figure 6:
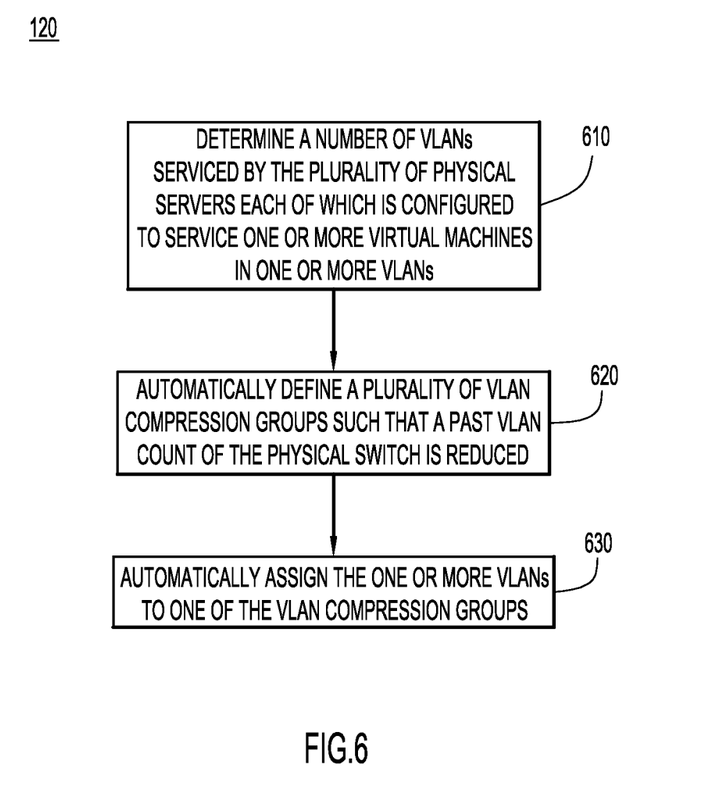
FIG. 6 shows an example flow chart depicting operations of the VLAN compression process logic to define the VLAN compression groups and to assign one or more VLANs to one of the VLAN compression groups.

Reference is now made to FIG. 6, which shows an example flow chart depicting operations of the VLAN compression process logic 120. At operation 610, the physical switch 102 determines a number of VLANs serviced by the plurality of physical servers 104(1)-104(n), each of which is configured to service one or more virtual machines in one or more of the VLANs. At operation 620, the physical switch 102 automatically defines a plurality of VLAN compression groups such that a port VLAN count of the physical switch 102 is effectively reduced. As described above, the port VLAN count identifies a number of VLANs that interface with the physical switch 102 via the plurality of physical ports 106(1)-106(p). At operation 630, one or more VLANs are automatically assigned to one of the VLAN compression groups.

It should be appreciated that the techniques described above in connection with all embodiments may be performed by one or more computer readable storage media that is encoded with software comprising computer executable instructions to perform the methods and steps described herein. For example, the operations performed by the physical switch or physical servers may be performed by one or more computer or machine readable storage media or device executed by a processor and comprising software, hardware or a combination of software and hardware to perform the techniques described herein. Furthermore, it should be appreciated that the VLAN compression techniques may be applied to virtual ports residing on virtual switches or virtual servers that interact with virtual machines in a similar manner as described herein.

In sum, a method is provided comprising: at a physical switch configured to interface with a plurality of physical servers via a plurality of corresponding physical ports of the switch, determining a number of virtual local area networks (VLANs) serviced by the plurality of physical servers each of which is configured to service one or more virtual machines in one or more of the VLANs; automatically defining a plurality of VLAN compression groups such that a port VLAN count of the physical switch is reduced, wherein the port VLAN count identifies a number of VLANs that interface with the physical switch via the plurality of physical ports; and automatically assigning the one or more VLANs to one of the VLAN compression groups.

In addition, an apparatus is provided comprising: a plurality of physical ports; a memory unit; and a processor coupled to the plurality of physical ports and the memory unit and configured to: determine a number of virtual local area networks (VLANs) serviced by a plurality of physical servers configured to interface with the physical ports and to service one or more virtual machines in one or more of the VLANs; automatically define a plurality of VLAN compression groups such that a port VLAN count is reduced, wherein the port VLAN count identifies a number of VLANs that interface with the physical ports; and automatically assign the one or more VLANs to one or more of the VLAN compression groups.

Furthermore, a computer readable storage media is provided that is encoded with software comprising computer executable instructions and when the software is executed operable to: determine a number of virtual local area networks (VLANs) serviced by a plurality of physical servers configured to interface with the physical ports and to service one or more virtual machines in one or more of the VLANs; automatically define a plurality of VLAN compression groups such that a port VLAN count is reduced, wherein the port VLAN count identifies a number of VLANs that interface with the physical ports; and automatically assign the one or more VLANs to one or more of the VLAN compression groups.

The above description is intended by way of example only. Various modifications and structural changes may be made therein without departing from the scope of the concepts described herein and within the scope and range of equivalents of the claims.

What is claimed is:

1. A method comprising:
   at a physical switch configured to interface with a plurality of physical servers via a plurality of corresponding physical ports of the switch, determining a number of virtual local area networks (VLANs) serviced by the plurality of physical servers each of which is configured to service one or more virtual machines in one or more of the VLANs;
   automatically defining a plurality of VLAN compression groups to reduce a port VLAN count of the physical switch, wherein the port VLAN count identifies a number of VLANs that interface with the physical switch via the plurality of physical ports; and
   automatically assigning the one or more VLANs to one of the VLAN compression groups to reduce an apparent load of the physical switch.

2. The method of claim 1, further comprising:
   associating each of the VLAN compression groups with a state value based on the assigning; and
   sending data packets received from a source virtual machine belonging to a first VLAN in a first one of the VLAN compression groups to a destination virtual machine belonging to a second VLAN in the first one of the VLAN compression groups based on the state value.

3. The method of claim 1, wherein the defining comprises generating an exclusion list of VLANs that are to be excluded from the assigning and wherein the assigning comprises assigning VLANs other than the VLANs in the exclusion list.

4. The method of claim 3, wherein generating the exclusion list comprises including VLANs in the exclusion list when they are identified as one of the following VLANs: Fiber Channel over Ethernet VLANs, primary private VLANs (PVLANs), secondary PVLANs, VLANs specified as a switched port analyzer network (SPAN) and VLANs configured as a single allowed VLAN on an interface.

5. The method of claim 3, wherein assigning VLANs other than the VLANs in the exclusion list comprises:
   determining a set of Ethernet interfaces that are configured to interface with one or more VLANs other than the VLANs in the exclusion list;
   for each Ethernet interface in the set of Ethernet interfaces, creating a set of allowed VLANs on each Ethernet interface;
   determining a minimum cardinality set of mutually disjoint subsets of the set of allowed VLANs on each Ethernet interface to identify the VLANs in the VLAN compression groups;
   for each of the VLAN compression groups, evaluating whether all VLANs in a corresponding VLAN compression group share a same management protocol; and if all VLANs in the corresponding VLAN compression group do not share the same management protocol, subdividing the corresponding VLAN compression group into additional VLAN compression groups, wherein all VLANs in each of the additional VLAN compression groups share the same management protocol.

6. The method of claim 1, wherein defining comprises defining the VLAN compression groups to reduce the port VLAN count below a maximum VLAN count associated with the physical switch.

7. The method of claim 1, wherein automatically defining comprises assigning each of the one or more VLANs to one of the VLAN compression groups automatically to reduce the port VLAN count without requiring a manual provisioning of the physical switch.

8. An apparatus comprising:
a plurality of physical ports;
a memory unit; and
a processor coupled to the plurality of physical ports and the memory unit and configured to:
determine a number of virtual local area networks (VLANs) serviced by a plurality of physical servers configured to interface with the physical ports and to service one or more virtual machines in one or more of the VLANs;
automatically define a plurality of VLAN compression groups to reduce a port VLAN count of the apparatus below a maximum VLAN count of the apparatus, wherein the port VLAN count identifies a number of VLANs that interface with the physical ports; and
automatically assign the one or more VLANs to one or more of the VLAN compression groups.

9. The apparatus of claim 8, wherein the processor is further configured to:
associate each of the VLAN compression groups with a state value based on the assigning; and
send data packets received from a source virtual machine belonging to a first VLAN in a first one of the VLAN compression groups to a destination virtual machine belonging to a second VLAN in the first one of the VLAN compression groups based on the state value.

10. The apparatus of claim 8, wherein the processor is further configured to:
generate an exclusion list of VLANs that are to be excluded from the assigning; and
assign VLANs other than the VLANs in the exclusion list to the one of the VLAN compression groups.

11. The apparatus of claim 10, wherein the processor is further configured to include VLANs in the exclusion list when they are identified as one of the following VLANs: Fiber Channel over Ethernet VLANs, primary private VLANs (PVLANs), secondary PVLANs, VLANs specified as a switched port analyzer network (SPAN), and VLANs configured as a single allowed VLAN on an interface.

12. The apparatus of claim 10, wherein the processor is further configured to:
determine a set of Ethernet interfaces that are configured to interface with one or more VLANs other than the VLANs in the exclusion list;
for each Ethernet interface in the set of Ethernet interfaces, create a set of allowed VLANs on each Ethernet interface;
determine a minimum cardinality set of mutually disjoin subsets of the set of allowed VLANs on each Ethernet interface to identify the VLANs in the VLAN compression groups;
for each of the VLAN compression groups, evaluate whether all VLANs in a corresponding VLAN compression group share a same management protocol; and
if all VLANs in the corresponding VLAN compression group do not share the same management protocol, subdivide the corresponding VLAN compression group into additional VLAN compression groups, wherein all VLANs in each of the additional VLAN compression groups share the same management protocol.

13. The apparatus of claim 8, wherein the processor is further configured to assign each of the one or more VLANs to one or more VLAN compression groups automatically to reduce the port VLAN count without requiring manual provisioning.

14. One or more non-transitory computer readable storage media encoded with software comprising computer executable instructions and when the software is executed operable to:
determine a number of virtual local area networks (VLANs) serviced by a plurality of physical servers configured to interface with the physical ports and to service one or more virtual machines in one or more of the VLANs;
automatically define a plurality of VLAN compression groups to reduce a port VLAN count, wherein the port VLAN count identifies a number of VLANs that interface with the physical ports; and
automatically assign each of the one or more VLANs to one or more of the VLAN compression groups to automatically to reduce the port VLAN count without requiring any manual provisioning.

15. The non-transitory computer readable storage media of claim 14 further comprising instructions operable to:
associate each of the VLAN compression groups with a state value based on the assigning; and
send data packets received from a source virtual machine belonging to a first VLAN in a first one of the VLAN compression groups to a destination virtual machine belonging to a second VLAN in the first one of the VLAN compression groups based on the state value.

16. The non-transitory computer readable storage media of claim 14, wherein the instructions operable to define comprise instructions operable to generate an exclusion list of VLANs that are to be excluded from the assigning and wherein the instructions operable to assign comprise instructions operable to assign VLANs other than the VLANs in the exclusion list.

17. The non-transitory computer readable storage media of claim 16, wherein the instructions operable to assign VLANs other than the VLANs in the exclusion list comprise instructions operable to:
determine a set of Ethernet interfaces that are configured to interface with one or more VLANs other than the VLANs in the exclusion list;
for each Ethernet interface in the set of Ethernet interfaces, create a set of allowed VLANs on each Ethernet interface;
determine a minimum cardinality set of mutually disjoin subsets of the set of allowed VLANs on each Ethernet interface to identify the VLANs in the VLAN compression groups;
for each of the VLAN compression groups, evaluate whether all VLANs in a corresponding VLAN compression group share a same management protocol; and
if all VLANs in the corresponding VLAN compression group do not share the same management protocol, subdivide the corresponding VLAN compression group into additional VLAN compression groups such that all VLANs in each of the additional VLAN compression groups share the same management protocol.

* * * * *